Dec. 9, 1958    D. F. HUTCHISON ET AL    2,863,616
SPINNING REEL
Filed Aug. 2, 1954    2 Sheets-Sheet 1
Fig. 1
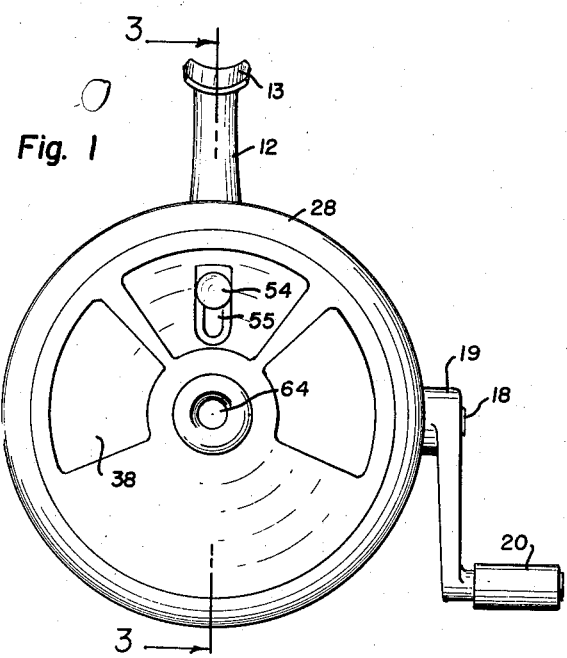
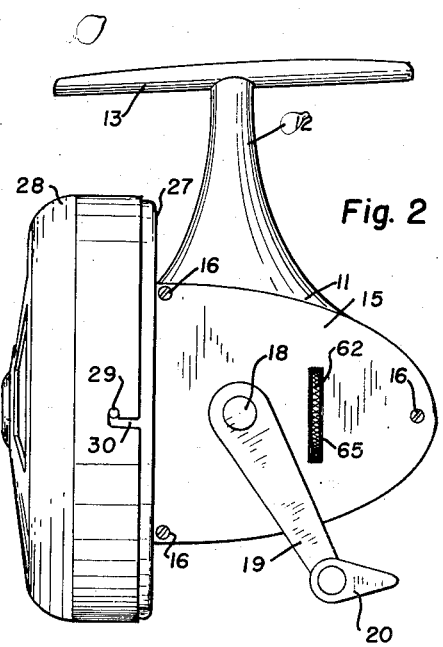
Fig. 2
Fig. 3
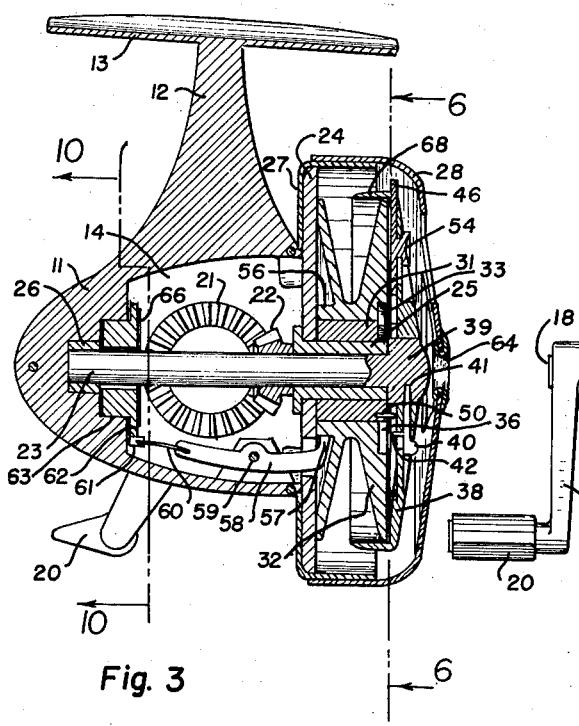
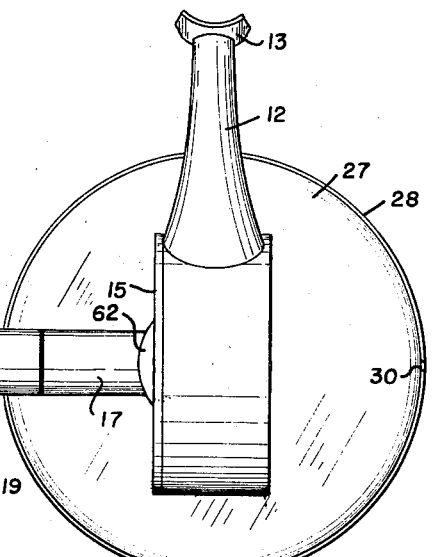
Fig. 4
INVENTORS
John M. Sweeney
Donald F. Hutchison
BY
ATTORNEY Dec. 9, 1958  D. F. HUTCHISON ET AL  2,863,616
SPINNING REEL
Filed Aug. 2, 1954  2 Sheets-Sheet 2

INVENTORS
John M. Sweeney
Donald F. Hutchison
BY
ATTORNEY

United States Patent Office 2,863,616
Patented Dec. 9, 1958

2,863,616
SPINNING REEL

Donald F. Hutchison and John M. Sweeney, Denver, Colo., assignors to Wright & McGill Co., Denver, Colo., a corporation of Colorado Application August 2, 1954, Serial No. 447,055

5 Claims. (Cl. 242—84.2)

This invention relates to a fishing reel, and more particularly to the type of reel known as a spinning reel, and has for its principal object the provision of a spinning reel which will enable the line spools to be quickly and easily changed and replaced while the reel is in use by the fisherman without requiring tools of any nature.

Another object of the invention is to provide a highly efficient brake or drag device which can be quickly and easily regulated while in use to place any desired resistance upon the line for fish "playing" purposes.

A further object is to provide a spinning reel from which the line can be rapidly spun without imparting rotation to the spool, without entangling, twisting or slapping the line, and without detrimental resistance so that a maximum cast may be obtained.

A still further object is to provide a highly efficient spinning reel in which a line retrieving mechanism will come into operation instantly and automatically when it is desired to retrieve the line and which will act to wind the line level upon the spool so as to prevent overlapping winds in the line.

Other objects and advantages reside in the detail construction of the invention, which is designed for simplicity, economy and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a front view of the improved spinning reel;

Fig. 2 is a left-side view thereof;

Fig. 3 is a vertical section through the improved reel, taken on the line 3—3, Fig. 1;

Fig. 4 is a rear view thereof;

Figure 5:
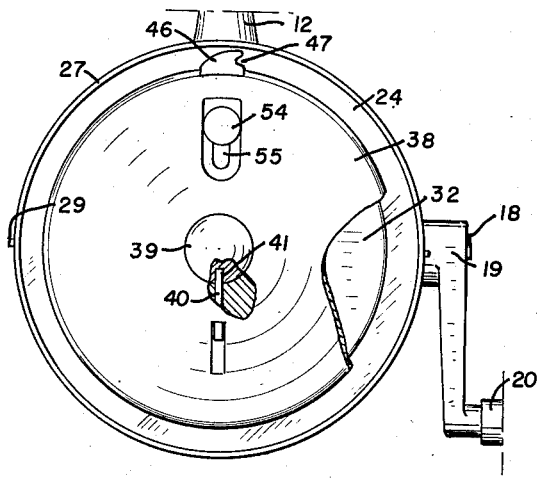
Fig. 5 is a fragmentary side view partially in section, illustrating the reel as it would appear with its covering hood removed therefrom.

The improved reel comprises a housing 11 formed with arcuate top and bottom contours and with two flat sides. A seat post 12 is formed on and arises from the housing 11, terminating in the usual rod-receiving foot 13. The housing 11 is formed with an internal cavity 14 which opens through one side thereof. The open side of the housing is normally closed by means of a face plate 15 secured thereto by means of attachment screws 16 or other suitable attachment devices.

A bearing sleeve 17 is formed on and extends outwardly from the face plate 15 to form a bearing for a crank shaft 18 adapted to be rotated by means of a hand crank 19 provided with a suitable finger grip 20. A bevel gear 21 is secured on the inner extremity of the crank shaft 18 within the cavity 14 and meshes with a beveled pinion 22 secured on a line-winding shaft 23.

The forward extremity of the cavity 14 is closed by means of a backing disc 24 secured to the housing in any desired manner such as by means of countersunk screws 69. The disc 24 supports a bearing bushing 25 in which one extremity of the line-winding shaft 23 is journalled. The other extremity of the shaft 23 is journalled in a bearing bushing 26 forced into the housing 11 at the rear extremity of the cavity 14.

The disc 24 extends outwardly about the forward extremity of the housing 11 to form a circular flange thereabout. A cup-shaped casing 27 is fitted about the backing disc 24 and extends forwardly therefrom. An enclosing hood 28 is fitted over the casing 27 and is detachably secured thereto by means of suitable attachment pins 29 and bayonet slots 30. The hood 28 is provided with an open line grommet 64 at its center.

Figure 6:
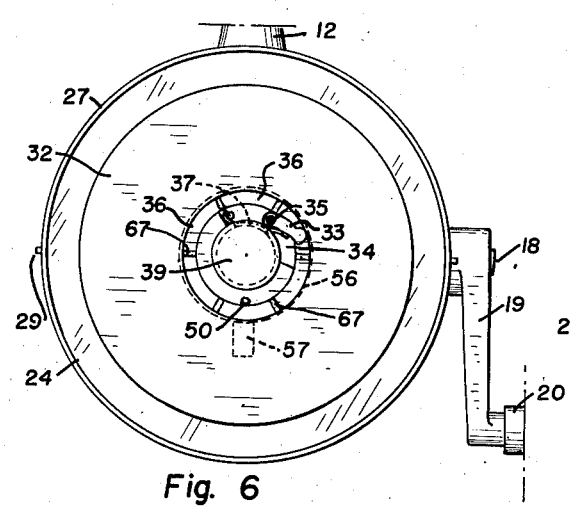
Fig. 6 is a similar view, illustrating the appearance of the reel with an element later described as a "flyer" removed therefrom.
Figure 7:
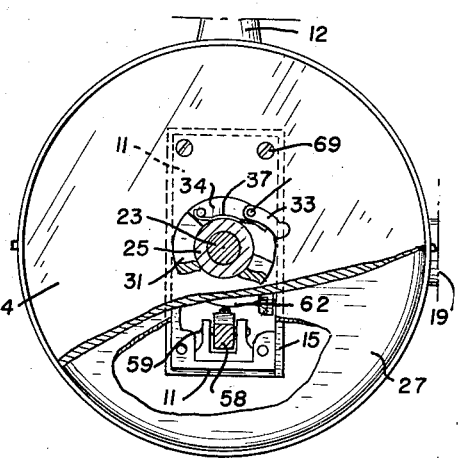
Fig. 7 is a similar view, illustrating the appearance of the reel with its line spool removed therefrom and with the back partially broken away to show internal structure.
Figure 10:
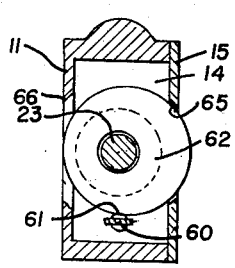
Fig. 10 is a vertical detail cross-section, taken on the line 10—10, Fig. 3.
Figure 9:
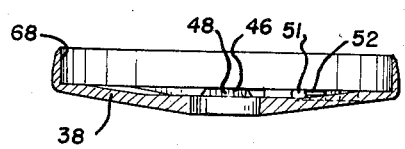
Fig. 9 is a cross-section through the flyer of Fig. 8, taken on the line 9—9, Fig. 8.

A tubular trunnion member 31 is mounted on the front bearing bushing 25 to receive a grooved line receiving spool 32. The line spool 32 is rotatable upon the trunnion member 31 in one direction, but is prevented from rotation in the other direction thereon by means of a ratchet pawl 33 mounted in an indentation 34 in the forward extremity of the trunnion member 31 upon a suitable pawl pin 35. The outer extremity of the pawl 33 travels in a circular counterbore 36 in the spool 32 and this outer extremity is resiliently held in the counterbore 36 by means of an outwardly acting leaf spring 37. A plurality of ratchet teeth 67 project into the counterbore against which the pawl 33 acts to prevent rotation of the spool in one direction (counterclockwise in Fig. 6) and over which the pawl clicks when the spool is rotated in the opposite direction.

A circular cup-shaped disc, which will be herein designated as the flyer 38, is removably mounted on an enlarged head 39 formed on the forward extremity of the winding shaft 23. The flyer is provided with a latch member 40 which is forced into a socket 41 in the head 39 by means of a leaf spring 42. The spring 42 is positioned in a recess 43 in the rear face of the flyer 38 and engages a side pin 44 projecting from the latch member 40 through a slotted opening 45 in the flyer 38.

A retractable line-winding finger 46, provided with dovetailed edges, is mounted in one side of the flyer 38 in dovetailed receiving grooves so that it may be projected beyond the periphery of the flyer to expose a line-engaging notch 47 formed in the finger 46 adjacent its outer extremity. The axial or inner extremity of the finger 46 is cam-shaped, as shown at 48. The cam-shaped extremity 48 projects into a circular cavity 49 formed about the axis on the rear face of the flyer 38. A cam pin 50 projects from the trunnion member 31 into the cavity 49 and is so positioned that it will be engaged by the cam-shaped inner extremity 48 on the finger 46 when the latter is withdrawn inwardly toward the axis. An actuating button 54 is formed on the finger 46 and projects through a radially elongated slot 55 in the flyer 38. The finger 46 is releasably held in either the projected or the withdrawn positions by means of a click member 51 which is urged by means of a leaf spring 52 into engagement with either of two stop notches 53 formed in one edge of the finger 46.

The spool 32 is provided on its rearward face with a braking hub 56 against which a brake shoe 57 is constantly and resiliently urged by means of a lever spring 60. The brake shoe 57 is formed on one extremity of a brake lever 58 mounted on a hinge pin 59 in the housing. The spring 60 is secured in and projects from the other extremity of the brake lever 58. The spring terminates in a cam-follower dog 61 which bears against the periphery of a knurled eccentric cam 62 the hub of which is journalled in a circular recess 63 in the rear of the housing and surrounds the winding shaft 23 out of contact with the latter.

When rotated, the knurled eccentric cam 62 acts to vary the radial distance between the axis of the cam and the dog 61. Thus, when the dog 61 is at a position of relatively great radial distance, the brake shoe 57 will bear against the hub 56 with greater pressure than when the dog 61 is in a position of lesser radial distance.

The knurled periphery of the cam 62 projects through a side slot 65 in the face plate 15 and through a similar side slot 66 in the housing so as to be easily accessible to the thumb and fingers of the fisherman. The knurling about the periphery of the cam 62 serves to frictionally engage the dog to hold the cam at any desired position so as to retain any desired pressure on the brake shoe 57.

Let us assume it is desired to make a free cast. The actuating button 54 of the winding finger 46 is pushed with the thumb toward the axis of the spool shaft to withdraw the winding finger within the periphery of the flyer so that the line is free to spin around the periphery around the periphery of the flyer and discharge through the grommet 64 in the hood 28 while the spool remains stationary under the restraining influence of the ratchet pawl 33.

Figure 8:
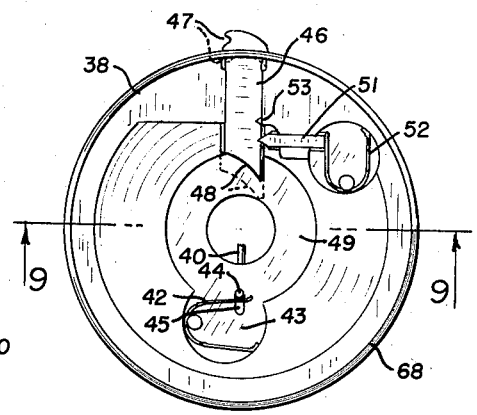
Fig. 8 is a detail view, illustrating the inside face of the flyer employed on the improved reel.

Now let us assume that it is desired to retrieve the line. It is only necessary to rotate the crank in a counter-clockwise direction, this causes the flyer in Fig. 5 to rotate clockwise at multiplied speed due to the difference in size between the gear 21 and the pinion 22. This rotates the cam extremity 48 of the winding finger 46 against the stationary cam pin 50 to cause the latter to force the winding finger radially outward to the solid line position of Fig. 8 so that the line notch 47 will engage the line and wind it about the line groove in the stationary reel as the flyer rotates.

Now let us assume it is desired to "play" a fish by allowing the line to run outwardly under controlled resistance. The crank is held stationary and the winding finger is projected into contact with the line. Now as the line is drawn outwardly through the grommet 64, it will tend to rotate the spool 32 in a clockwise direction in Fig. 6, causing the ratchet teeth 67 to click past the ratchet pawl 33 giving an audible signal that the line is running out. The resistance to rotation can be constantly and accurately controlled by the fisherman's thumb by adjusting the position of the knurled cam 62 to vary the braking resistance of the brake shoe 57.

Let us assume it is desired to change spools. The hood 28 is removed by turning it slightly to release the bayonet slots 30 and is then pulled straight forward. The flyer release latch member 40 is now pulled radially outward to release it from the socket 41 in the head 39 on the spool shaft so that the flyer can be pulled directly from the head. It is preferred to turn the flyer slightly after releasing the latch to prevent the latch member 40 from reentering the socket 41 until the flyer can be removed. The spool 32 now is turned slightly clockwise to cause one of the ratchet teeth to force the ratchet pawl 33 inwardly until it releases the spool which can then be pulled straight from the trunnion member 31. To reinsert a spool, it is only necessary to reverse the above procedure. It will be noted that no tools are required, no threads can be damaged and no small parts can be lost.

It is desired to call attention to the cup-like edge on the flyer 38, as shown at 68. This edge is formed of very smooth hard metal to provide a minimum of line resistance and it will be noted the edge extends rearwardly over the spool to approximately the center plane thereof. The line is retrieved over this edge directly into the middle of the groove in the spool so that it will always travel to and build up the low side of the coiled line to produce an automatic level wind across the width of the spool.

The invention has been described and illustrated as applied to a left hand wind reel. It would operate similarly and equally well on a right hand wind reel.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A fishing reel comprising: a housing having an internal cavity open to one end and one side of said housing; a face plate closing said open side; a bearing sleeve carried by said face plate; a crank shaft journalled in said bearing sleeve and extending into said cavity through the open side of the latter; a line-winding shaft journalled in the closed end of said cavity and extending forwardly through the open end of the latter; bevel gears within said cavity transmitting rotation from said crank shaft to said winding shaft; a backing disc secured to said housing about said winding shaft and closing the open end of said cavity, said backing disc extending outwardly about the forward extremity of the housing to form a circular flange thereabout; a bearing bushing mounted in said backing disc and extending forwardly along said winding shaft to provide a bearing therefor; a tubular trunnion member fixedly mounted on and surrounding said bearing bushing; a grooved line spool rotatably mounted on said trunnion; a head formed on said winding shaft substantially equal in diameter to the diameter of said bushing; a circular flyer posititioned about said head in proximity to the outer face of said line spool; a withdrawable latch member on said flyer engaging a socket in said head to retain said flyer fixedly thereon; a flange extending from said flyer about said pool, said flange terminating approximately at the center of the peripheral groove in said spool; a radially-projectable line-winding finger slidably mounted on the inner face of said flyer positioned so that when projected, it will engage and wind a fishing line in the groove of said spool as said winding shaft is rotated, a cup-shaped casing fitted about the backing disc and extending about said spool; an enclosing hood fitted over said casing and provided with a line opening in axial alignment with said winding shaft; an actuating button mounted on said line winding finger and extending through an elongated opening in said flyer to the outer face of the latter so as to be accessible through openings formed in said hood.

2. A fishing line as described in claim 1 having a ratchet dog mounted on and in an indentation in said trunnion member and ratchet teeth formed in said spool about said trunnion and positioned to be engaged by said dog.

3. A fishing reel comprising: a casing, a winding shaft journalled in said casing; means for rotating said winding shaft; a spool positioned concentrically about said winding shaft and being rotatable relative to said winding shaft; a disc positioned adjacent one face of said spool; means for detachably attaching said disc to said winding shaft so that it will rotate therewith; a hood member over said disc having a concentric line passage therein for guiding a line axially toward said disc; an extensible line winding finger arranged to be projected beyond the periphery of said disc to engage the line between said line passage and said spool to wind the line on the spool in consequence of the rotation of said disc; a circular braking drum formed on said spool; a brake lever pivotally mounted adjacent said drum; a brake shoe formed on said lever and positioned to frictionally engage said drum; resilient means mounted on said lever and acting to exert a resilient bias on said lever to force said shoe against said braking drum, and an eccentric disc rotatably mounted in said casing in position to flex said resilient means to vary the resilient bias on said brake lever, a portion of the periphery of said disc projecting through a slot in said casing in position to be engaged by a finger of the operator to adjust the angular position thereof and thereby vary the friction exerted by said brake lever on said drum.

4. A fishing reel comprising: a cup-like enclosing casing; a line-winding shaft concentrically positioned in said casing; means for rotating said winding shaft; a spool positioned concentrically and rotatably about said winding shaft; a disc positioned adjacent one face of said spool; means for attaching said disc to said shaft so that it will rotate therewith independently of said spool; a cup-like edge formed about the periphery of said disc extending over said spool to guide a fishing line thereon; a hood member closing said casing over the forward face of said disc, said hood member having a concentric line passage for guiding a line axially toward said disc; and an extensible longitudinally slidable line winding finger arranged to be projected beyond the periphery of said disc to engage the line between said line passage and said spool to wind the line on the spool in consequence of the rotation of said disc, a stationary trunnion concentrically disposed about said winding shaft, said trunnion being provided with a longitudinally projecting stop member from an extremity thereof adjacent said disc, the inner extremity of said extensible finger being formed with an incline adapted to engage said stop to cause said finger to be projected into line engaging position when said disc is rotated in line retrieving direction, and spring detent means for retaining said finger in projected position.

5. A fishing reel as defined in claim 4 wherein said disc is provided with a withdrawable latch adapted to engage a socket in said winding shaft to releasably secure said disc on said shaft.

References Cited in the file of this patent

UNITED STATES PATENTS

| | | |
|---|---|---|
| 2,229,470 | Pezon | Jan. 21, 1941 |
| 2,344,209 | Lowe | Mar. 14, 1944 |
| 2,507,457 | Rix | May 9, 1950 |
| 2,521,543 | Shakespeare et al. | Sept. 5, 1950 |
| 2,613,468 | Hand | Oct. 14, 1952 |
| 2,633,307 | Morgan et al. | Mar. 31, 1953 |
| 2,649,258 | Shelburne | Aug. 18, 1953 |
| 2,719,680 | Denison et al. | Oct. 4, 1955 |
| 2,749,058 | Hill | June 5, 1956 |

FOREIGN PATENTS

| | | |
|---|---|---|
| 711,190 | Great Britain | June 23, 1954 |